United States Patent [19]

Sherman

[11] Patent Number: 4,835,902
[45] Date of Patent: Jun. 6, 1989

[54] DEFLECTIVE TAMPER RESISTANT RODENT BAIT STATION

[76] Inventor: Daniel Sherman, 1355 Bobolink Pl., Los Angeles, Calif. 90069

[21] Appl. No.: 205,838

[22] Filed: Jun. 13, 1988

[51] Int. Cl.4 ............................................. A01M 1/20
[52] U.S. Cl. ...................................................... 43/131
[58] Field of Search ........................................... 43/131

[56] References Cited

U.S. PATENT DOCUMENTS

| | | | |
|---|---|---|---|
| 4,161,079 | 7/1979 | Hill | 43/131 |
| 4,182,070 | 1/1980 | Connelly | 43/131 |
| 4,281,471 | 8/1981 | Jenkins | 43/131 |
| 4,453,337 | 1/1984 | Williams | 43/131 |
| 4,541,198 | 9/1985 | Sherman | 43/131 |
| 4,619,071 | 10/1986 | Willis | 43/124 |
| 4,648,201 | 3/1987 | Sherman | 43/131 |

*Primary Examiner*—Gene P. Crosby

[57] ABSTRACT

The invention relates to the containment of a block of rodenticide bait in a manner that precludes the contact of said bait by unintended target species such as children, pets, and wildlife. This device is used to provide a compact method of presenting baits to target species such as house mice, in a manner that is both safe and effective, and in such a manner that will not allow probing at the toxic substance with flexible objects such as wires, straws and other similar structures that might be bent into an easily fabricted configuration by children. The use of a sophisticated series of internal baffle structures that protect the bait from contact by objects inserted from the outside while allowing a rodent to easily traverse the bait station and consume the bait contained therein, make this device one of the most practical methods of presenting poisoned substances in areas that might become accessible to childred, pets and wildlife.

2 Claims, 2 Drawing Sheets

DEFLECTIVE TAMPER RESISTANT RODENT BAIT STATION

BACKGROUND OF THE INVENTION

Rodent control in the past few years has become more and more complex as the toxicity of the active ingredients of various rodenticide products became more lethal to man and domestic animals.

The use of these highly potent substances require the user to exercise more care in the placement of the poisoned substances in order to avoid harming or even possible killing non target species.

Development of "tamper-resistant" containers to isolate these toxins has been one of the most sig1nificant developments of new laws that have been rigidly enforced.

More recently, the U.S. Environmental Protection Agency has established a set of standards for the adequate isolation of baits in areas that they may come into contact with children, pets, and wildlife.

These standards have resulted in the need for devices that more effectively contain the poisoned baits under circumstances that have never before been quantified to such an extent.

In the past few years patents have been granted to numerous device to contain and isolate poisoned bait and these are reflected in U.S. patents in Class 43/131 such as U.S. Pat. Nos. 4,349,981 9/1982 Sherman—4,031,653 6/1977 Jordan—4,161,079 7/1979 Hil-1—4,400,904 8/1983 Baker—4,541,198 9/1985 Sherman—Foreign Pat. Nos. 6617388 5/1968 Netherlands and 2111022 9/1972 Federal Republic of Germany, U.S. Pat. No. 4,648,201 3/1987 Sherman.

While the aforementioned patents advanced the state of the art, they were defective in that they did not take into consideration the possible use of probing object that could be shaped, and thereby could be inserted with some degree of ease into a container, that by its very function, needed to contain a method of entry and egress for the target species to be eliminated.

Although some designs incorporated baffle type internal structures, these baffles were placed some distance from the bait and were designed to deflect or channel probes away from the direction of the bait compartments.

The baffles were not designed to cooperate with a specific type or size of bait and they proved to be defective because common objects could be "shaped" into probes that would allow pieces of the poisoned bait to be chipped away and thereby possibly poison the very subjects that they were designed to isolate the bait from.

This is especially true of the Sherman U.S. Pat. No. 4,648,201 dated Mar. 10, 1987 which was designed to eliminate the possibility of a rigid probe being inserted into the unit and being deflected by the opposing tunnel walls.

The object of the instant invention is to overcome these deficiencies by providing a bait containment device that isolates the bait not only from probing with a rigid or short object, but also provides a higher degree of protection from the possible insertion of common objects that could be bent into easily defined shapes that could be used to attack the poisoned substances contained in the bait station.

Still another object of the invention is to improve on those units constructed with baffles that direct a rigid probe away from the bait compartment but do not provide proximity protection to the poisoned bait at the point of most probable contact.

And yet another feature of the instant invention is to provide this protection to the poisoned bait while allowing access to the bait by the target species that the bait station has been designed to eliminate.

These and other novel feature of the invention are disclosed in the drawings and in the written description contained herein, and the teachings will disclose a safe and effective method for presenting rodent baits in areas that might be accessible to children, pets and wildlife in a manner that protects the bait from coming into contact with non target species.

DETAILED DESCRIPTION OF THE DRAWINGS

Figure 1:
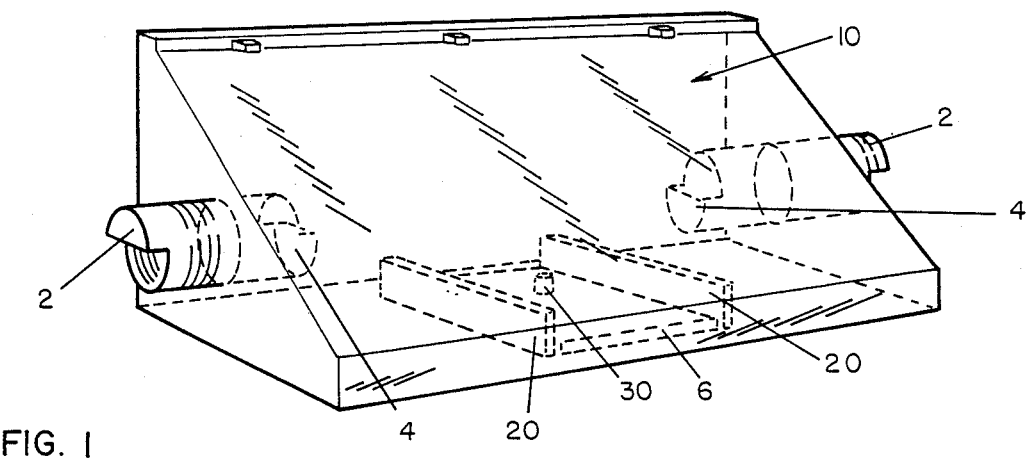
FIG. 1 demonstrates the overall construction of the bait station and shows the relationship of the various component parts, illustrated is the positioning of the entrance and egress portals on opposing sides and the position of the poisoned bait block which has been placed intermediate to the two portals. Also shown are the deflective walls that are positioned in proximity to the bait block and between each of the portals.

In FIG. 1 we see the structure of the deflective tamper resistant bait depicted as 10 with two portals located at opposing ends of the structure and said portals containing a primary baffle system 2 and 4 that act to divert a probing solid object from contact with the rodent bait 6 that has been centrally located over pin 30 in the direct pathway of the baiters interior. Also shown are the secondary deflective baffle walls 20 which have been paces intermediate to the primary baffles 2 and 4 and the rodent bait block 6.

Figure 2:
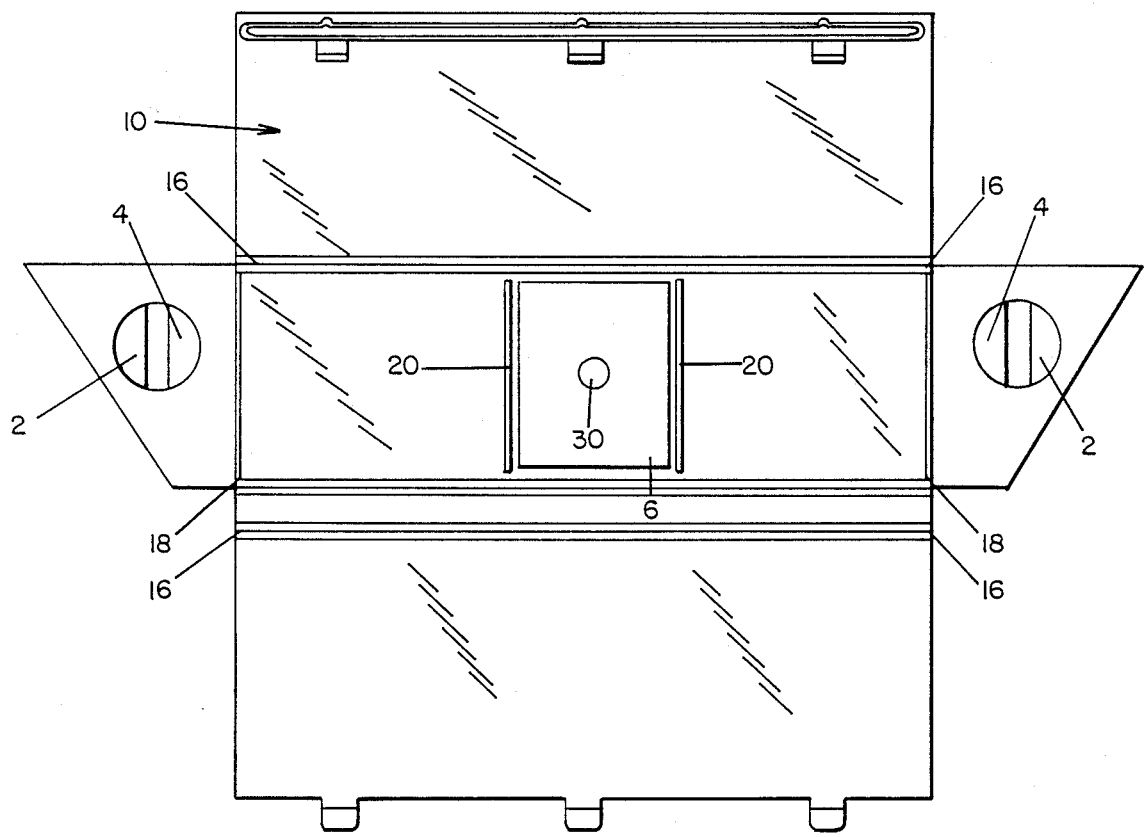
FIG. 2 is an open, top view of the bait station showing the perspective of the station in a fully opened position before it has been assembled to the finished triangular shape. This depiction shows a series of flangable grooves that are used to delineate the fold lines of the opened baiter and to act as guides that insure the unit will forms a tightly integrated units when fully assembled. Also depicted is the relationship between the bait block, the proximity baffles walls, and the positioning of these components to the ends of the baiter.

FIG. 2 is a top perspective of the deflective rodenticide bait station 10 in an open, or knocked down configuration. This demonstrates the use of flangable grooves 16 and 18 that are formed as channels along the portion of the bait station that must fold into position to form the integrated structure 10 that protect the bait block 30 from possible tampering. The primary baffles 2 and 4 are shown to be contained within a tunnel structure and the positioning of the secondary baffle walls 20 are shown to be positioned in a manner that will protect the bait block 30 in a vertical manner when the sides have been folded along the flangable groove 18 to erect a vertical wall at each of the opposing ends.

Figure 3:
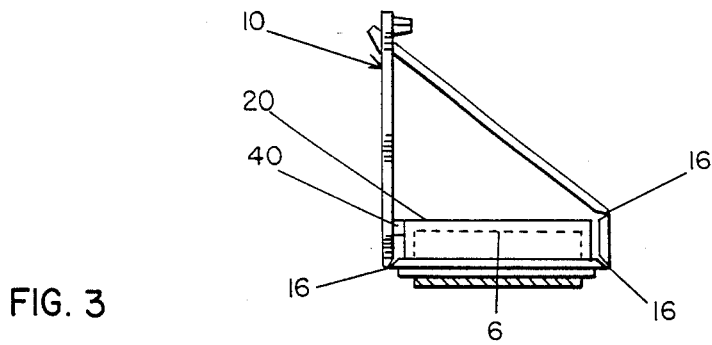
FIG. 3 is a side view of the bait station that shows the relationship of the proximity baffle wall to the height of the bait block and depicts the space that has been allowed above the block for the target rodent to traverse the baiter and which will allow the rodent to feed at the top of the block with relative ease.

FIG. 3 is a side view of the interior of the deflective tamper resistant bait station 10 with the end portal removed. Shown in this drawing is the vertical relationship between the rodent bait block 6 and the secondary deflective walls 20. The bait block 6 is deliberately designed to be shorter then the secondary deflective wall 20 so as to impede the possible probing and contact of the block with a flexible object that might be inserted into the passageway. A spacer 40 has been placed between the rear wall of the baiter 10 and the secondary baffle 20 in order to provide a higher degree of rigidity to the structure. The walls have been formed into the triangular shape by folding them on the flangable grooves 16 which run the length of the structure 10.

Figure 4:
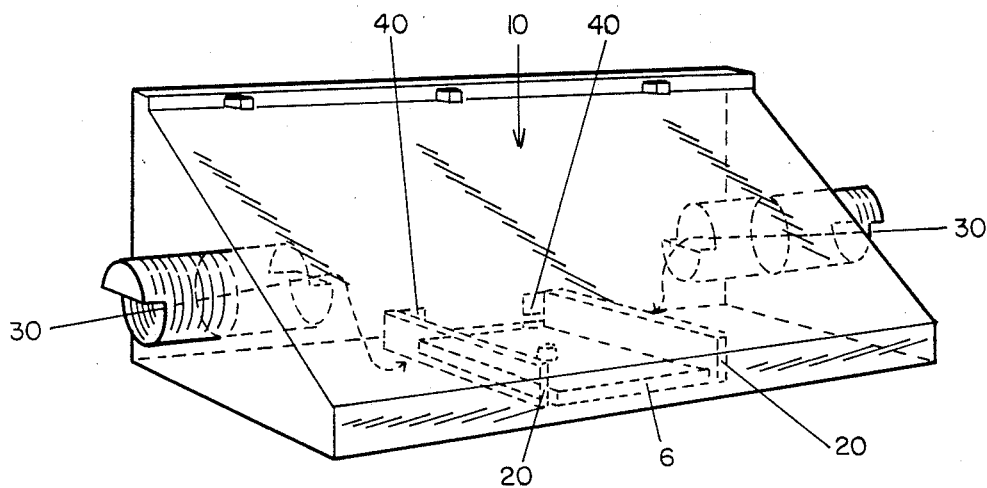
FIG. 4 is a total demonstration of the relationships of all components and a depiction of the path that would be followed by a flexible or short object that had been bent downward to attempt to contact the bait block. The blocking effect of the the proximity baffles walls are shown in this drawing and their ability to protect the bait is demonstrated.

FIG. 4 demonstrates the overall concept of the primary deflective baffles and how they work in relationship to the secondary deflective baffles 12. A flexible object as depicted as 30 that has been bent into a shape that would allow it to reach over the primary baffle structure in order to probe the bait block 6 would come into contact with the secondary baffle system 20 an therefore be stopped prior to its contact with the bait block. Any attempt to press past the secondary baffle 20 would cause the object to be diverted over the secondary baffle walls 20 a prevent their contact with the bait block 6. The entire structure has been reinforced by the introduction of the supports and spacers 40.

What I claim is:

1. A deflective tamper-resistant rodent bait station; said bait station having a centrally located passageway; said passageway containing an opening for rodents to enter and exit at opposing ends; said passageway containing a block of rodent bait positioned intermediate to its opposing ends; said rodent bait having a baffle structure interposed in proximity to either side of said bait block; said baffle structure presenting a barrier between the outer edge of said bait block and the nearest portal opening at each of the opposing sides; said baffle structure constructed higher then said bait block; said baffle being configured totally shield said bait block from contact with a flexible object that had been inserted from the end nearest the closest portal to the said bait block.

2. A deflective tamper-resistant rodent bait station as in claim 1; said bait station having limited access portals located at opposing ends of said bait station; said limited access portals having a primary deflective shield to position an object away from a rodent bait block located in a direct line with said portals.

* * * * *